Figure 1:
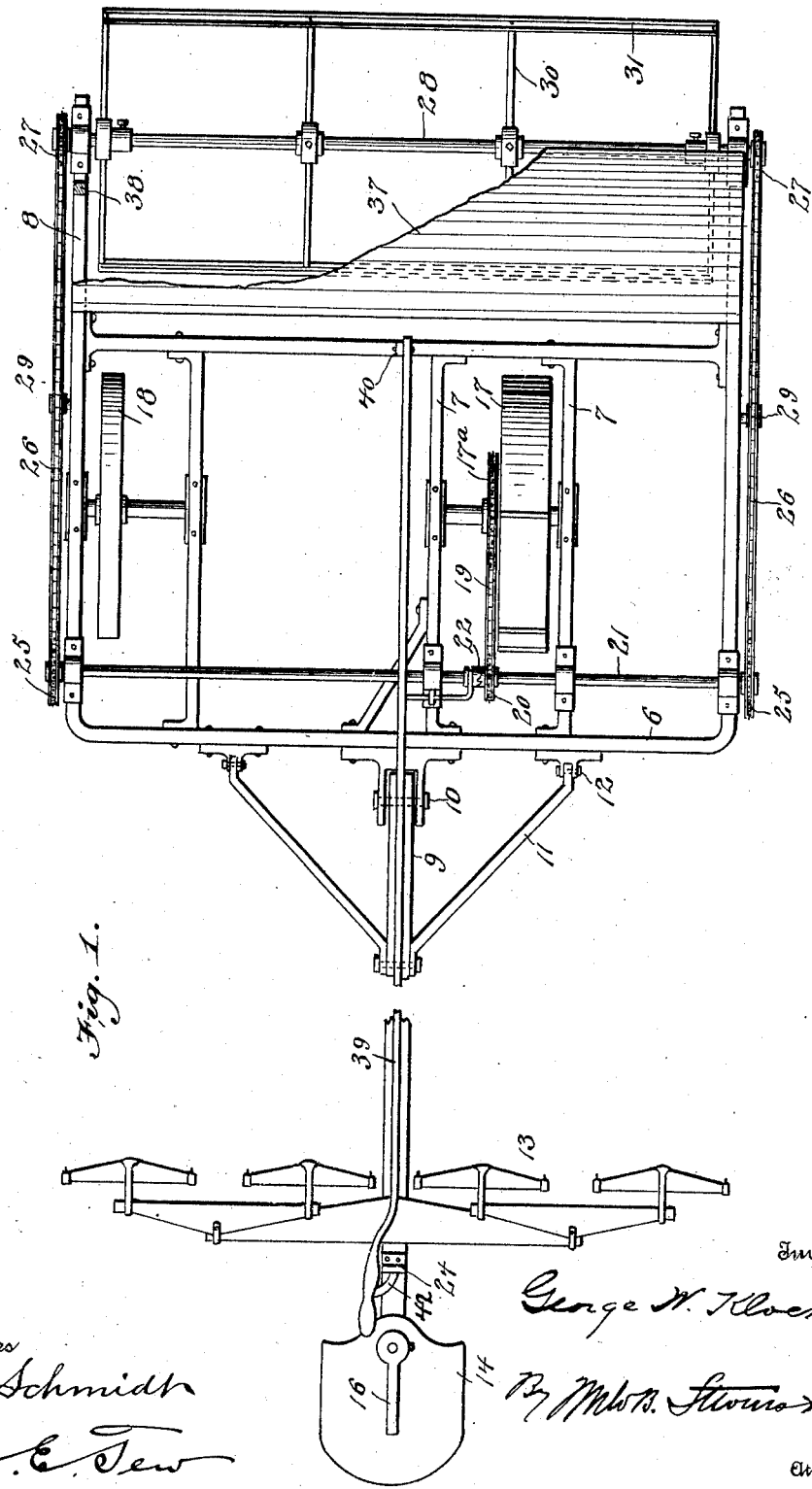

No. 868,871. PATENTED OCT. 22, 1907.
G. W. KLOCK.
STALK CUTTER.
APPLICATION FILED DEC. 28, 1906.

2 SHEETS—SHEET 1.

Witnesses
M. A. Schmidt
Geo. E. Tew

Inventor
George W. Klock.
By Mich. B. Stevens &Co.
Attorneys

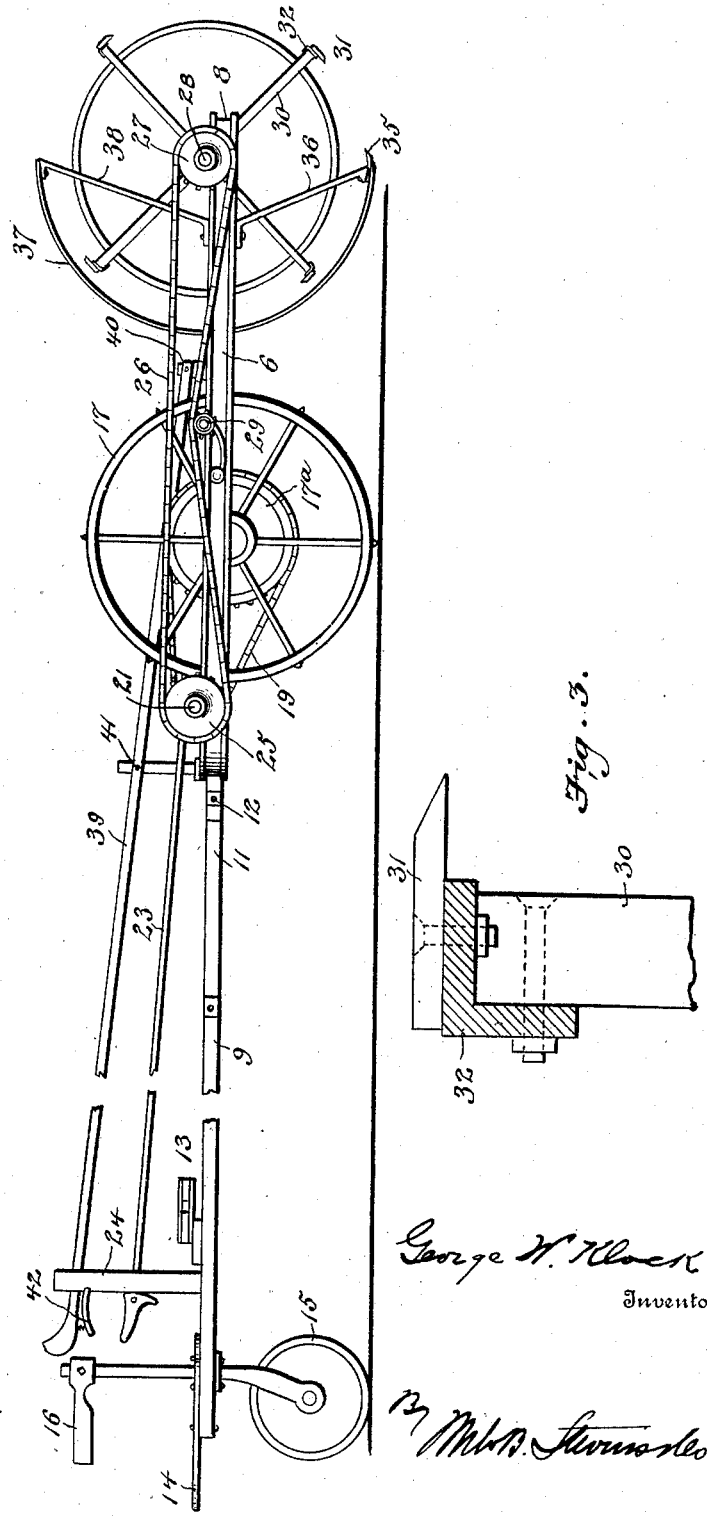

UNITED STATES PATENT OFFICE.

GEORGE WADE KLOCK, OF CHILLICOTHE, TEXAS.

STALK-CUTTER.

No. 868,871.　　　　　Specification of Letters Patent.　　　　　Patented Oct. 22, 1907.

Application filed December 28, 1906. Serial No. 349,808.

*To all whom it may concern:*

Be it known that I, GEORGE WADE KLOCK, a citizen of the United States, residing at Chillicothe, in the county of Hardeman and State of Texas, have invented new and useful Improvements in Stalk-Cutters, of which the following is a specification.

This invention is a chopper and it has for its object to provide means for cutting stalks of old cotton or other plants preparatory to plowing or otherwise cultivating the land. The machine is particularly characterized by improvements with respect to the construction of the rotary cutter and the means to drive the same, and also with respect to the means for raising and lowering the cutter to various distances from the ground.

The machine is illustrated in the accompanying drawing, in which

Figure 1 is a top plan view thereof. Fig. 2 is a side elevation. Fig. 3 is a detail in section.

Referring specifically to the drawings, 6 indicates a substantially rectangular frame conveniently formed of channel or angle iron and connected across by cross beams 7. The side pieces of the frame project at the front, as indicated at 8, to support the rotary knife. To the rear of the frame, at or about the middle thereof, is pivotally connected the tongue 9, by means of a single pivot bolt at 10, and the tongue braces 11 are also pivoted as indicated at 12. This is for the purpose of allowing the frame to be tilted with respect to the tongue. At the rear end of the tongue are the draft devices 13 and a platform 14, and said end is mounted upon a steering wheel 15 which is operated by a handle 16 in convenient reach of the operator on the platform.

The main frame is mounted upon a driving wheel 17 and a side wheel 18, the former of which is located near the middle of the frame and carries most of the weight, the axles of the wheels being carried in suitable bearings on the cross bars 7. The shaft of the wheel 17 carries a sprocket 17ª which is connected by a chain belt 19 to sprocket 20 loose on a cross shaft 21. A clutch 22 is provided to throw the cutter in and out of gear, the said clutch being operated by a long rod 23 extending back over the tongue to a post 24 on the platform 14 and in convenient reach of the operator. The shaft 21 has sprockets 25 at its opposite ends belted by chains 26 to a sprocket 27 on the shaft 28 of the rotary cutter, said shaft being carried in bearing boxes at the front ends of the arms 8 heretofore referred to. Spring-pressed idle wheels 29 are placed under the chain belts, to tighten the same.

The cutter comprises the shaft 28, a series of radial arms 30 projecting from collars thereon, and a corresponding series of longitudinal knives 31 located at the outer ends of the arms and extending parallel to the axis of the shaft. The knives are supported by angle bars 32 which are bolted to the ends of the arms, and the cutting edges of the knives are presented tangentially and they cut downwardly and backwardly on the cutting strokes. Working in coöperation with the knives 31 is a fixed knife 35 extending across the machine close to the ground and under the cutter blades. This knife 35 is carried by arms 36 depending from the side frames. A shield 37 extends around the rear half of the cutter, the lower end thereof being secured to the knife 35 and the upper end thereof being supported by arms 38 projecting upwardly from the frame. The shield is for the purpose of preventing the cutter wheel from throwing the stalks back upon the main part of the machine.

The frame is balanced or pivoted on the axles of the supporting wheels 17 and 18 and may be tilted to raise or lower the cutter by means of a long lever 39 which is connected at 41 to a post on the rear bar of the frame and is connected at its front end to the frame, as indicated at 40, at a point in advance of the axis of the wheels. The rear arm of lever extends back over the tongue to the post 24, convenient to the operator, and is provided with a latch 42 which engages notches in said post. By manipulating the lever the angle of the frame may be varied and consequently the height of the cutting wheel from the ground adjusted.

The machine is driven across the field with the cutter in advance of the team, being steered or guided by the wheel 15, and the rotary cutter is driven by the driving connections from the drive wheel 17 and acts to chop and cut the stalks in the field, for the purpose intended.

I claim:

1. A stalk cutter comprising a wheeled tilting frame, a cutter at the front thereof, a tongue pivoted at its front end to the rear of the frame and provided at its rear end with a steering and supporting wheel and a platform, and a lever connected to the frame and extending rearwardly to the platform and adapted to tilt the frame.

2. A stalk cutter comprising a wheeled tilting frame, a cutter at the front thereof, a tongue pivoted to the rear of the frame and provided with steering and supporting means, and means to adjustably tilt the frame, to raise or lower the cutter.

3. A stalk cutter comprising a frame, a driving wheel located toward the middle of the frame, to sustain the main part of the weight thereof, an outer supplemental supporting wheel, a rotary cutter journaled in bearings on the front of the frame and having driving connections to the driving wheel, and draft means at the rear of the frame.

In testimony whereof I have signed my name to this specification in the presence of two subscribing witnesses.

GEORGE WADE KLOCK.

Witnesses:
　J. L. FLEMING,
　EARNEST WORD.